United States Patent [19]

Cesarini

[11] Patent Number: 4,756,660
[45] Date of Patent: Jul. 12, 1988

[54] TRUCK WITH ROTATABLE PLATFORM SUITABLY DESIGNED FOR APPROACH AND COPENETRATION BY INTERMEDIATE TRANSPORTATION MEANS, FOR AUTOMATICALLY TRANSFERRING AIRCRAFT CARGO UNITS

[75] Inventor: Franco Cesarini, Ariccia, Italy

[73] Assignee: Geo Meccanica Idrotecnica S.R.L., Campoleone, Italy

[21] Appl. No.: 31,217

[22] Filed: Mar. 30, 1987

Related U.S. Application Data

[63] Continuation of Ser. No. 748,461, Jun. 25, 1985, abandoned.

[30] Foreign Application Priority Data

Jul. 2, 1984 [IT] Italy ................................ 4848 A/84

[51] Int. Cl.[4] .............................................. B60P 1/52
[52] U.S. Cl. ...................................... 414/536; 414/533; 414/401; 414/373; 414/349; 104/45; 104/49; 193/35 C
[58] Field of Search ............... 414/386, 584, 536, 349, 414/529, 373, 533, 401, 532, 535, 530, 396, 39, 531, 537, 389, 345, 343, 340, 341, 573, 398, 352, 353; 104/48, 49, 45; 193/35 C, 35 R, 35 G

[56] References Cited

U.S. PATENT DOCUMENTS

| 2,896,548 | 7/1959 | Obes ................................ 414/341 X |
| 3,561,625 | 2/1971 | Dioguardi et al. ............. 414/536 X |
| 3,655,075 | 4/1972 | Carder et al. . |
| 3,675,798 | 7/1972 | Garder et al. ..................... 414/533 |
| 3,679,075 | 7/1972 | Guyaux et al. .................... 414/533 |
| 3,684,108 | 8/1972 | Olson .............................. 414/536 X |
| 3,690,485 | 9/1972 | Fischer et al. .................. 414/529 X |
| 3,807,584 | 4/1974 | Herr ..................................... 414/373 |
| 3,830,385 | 8/1974 | Young ................................. 414/536 |
| 4,134,345 | 1/1979 | Baldwin et al. ................. 414/536 X |
| 4,199,290 | 4/1980 | Jacoby ............................. 414/401 X |
| 4,541,768 | 9/1985 | Walker et al. ................... 414/536 X |

FOREIGN PATENT DOCUMENTS

| 2427946 | 1/1980 | France . |
| 931316 | 5/1971 | Italy . |
| 82640 | 7/1981 | Japan .................... 414/349 |
| 2113175 | 8/1983 | United Kingdom . |

Primary Examiner—Frank E. Werner
Attorney, Agent, or Firm—Fleit, Jacobson, Cohn & Price

[57] ABSTRACT

A towable truck with a rotatable platform for transferring cargo units from or to intermediate transportation devices, for handling goods in particular within airport structures. The platform comprises alternate projecting and re-entering parts which, when the truck is in its loading or unloading position, are disposed along the longitudinal sides of this latter and are suitably designed for approach and copenetration by intermediate transportation devices or the like comprising complementary terminal parts provided with motorized rollers, so as to allow automatic transfer of the cargo units.

2 Claims, 4 Drawing Sheets

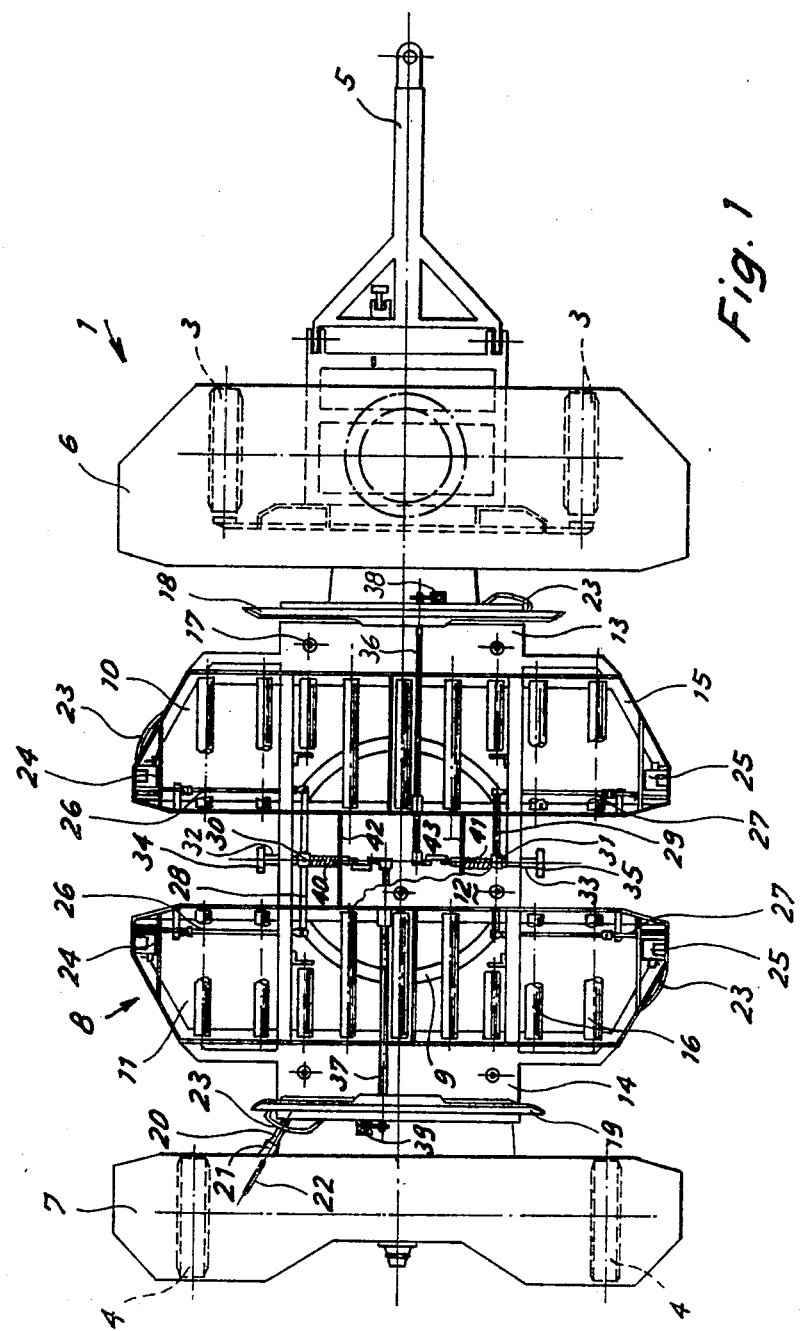

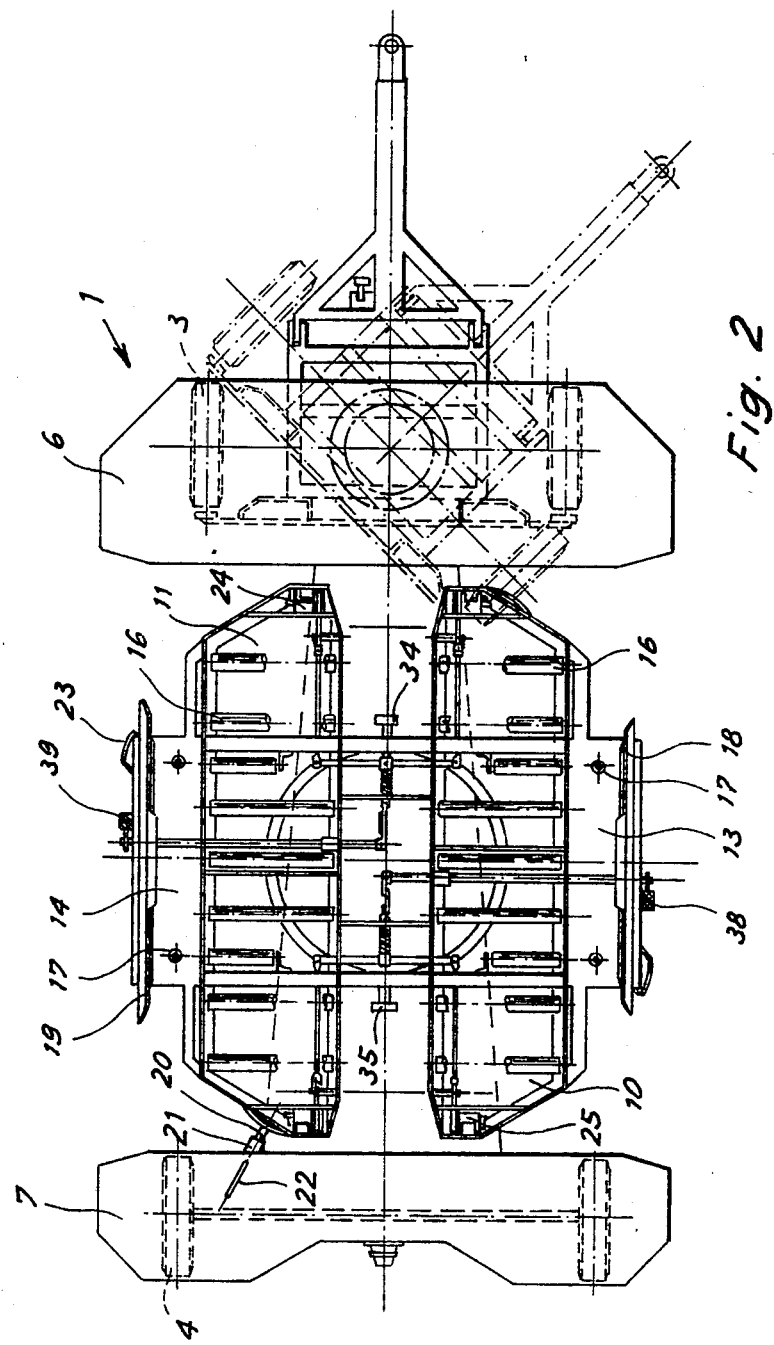

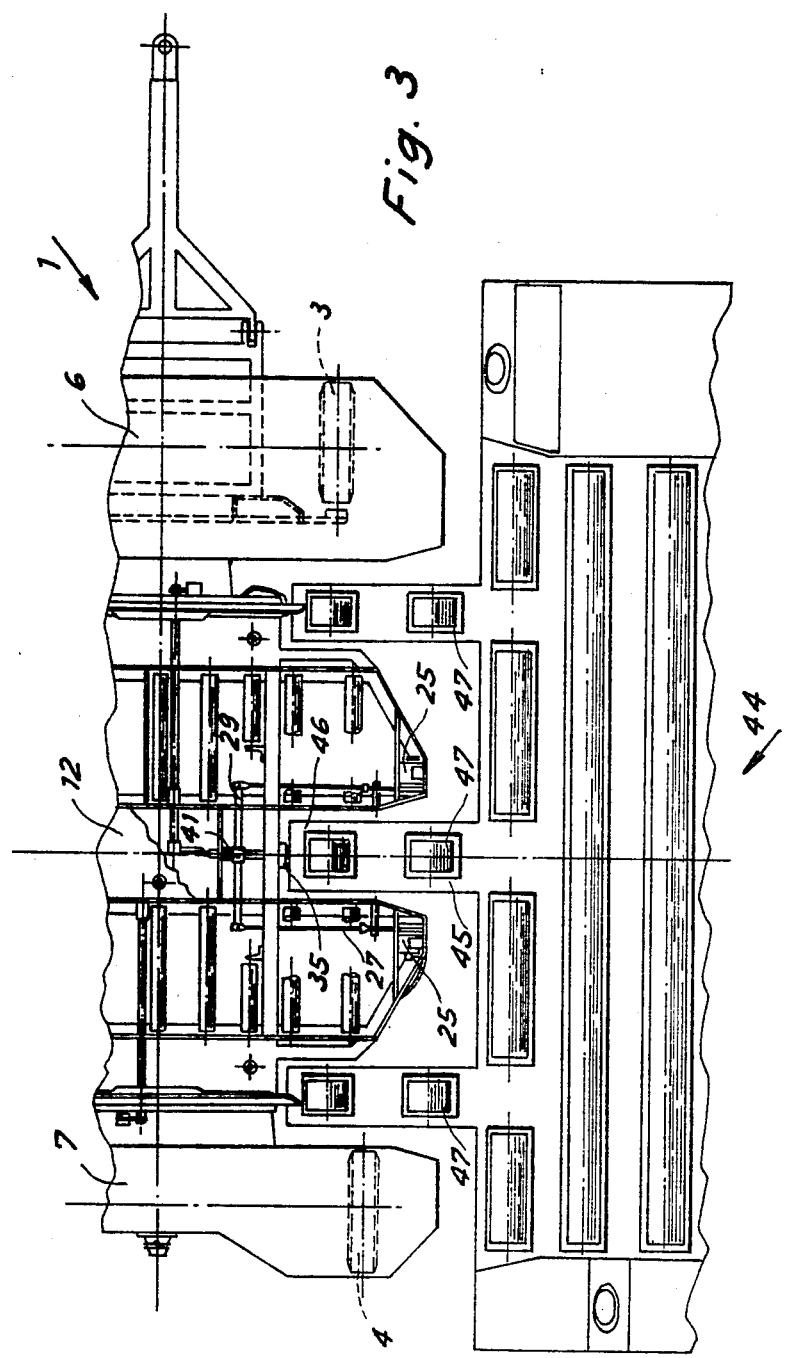

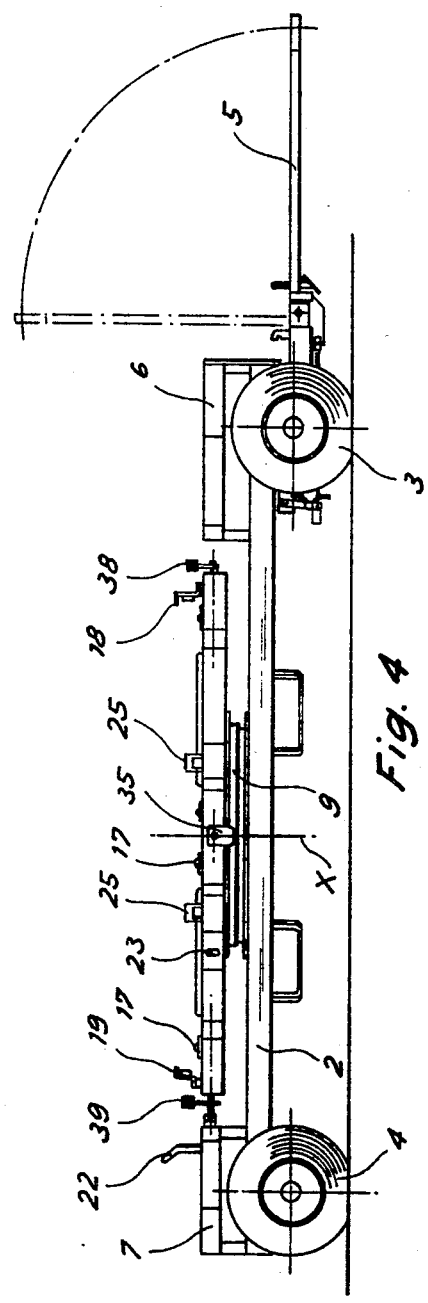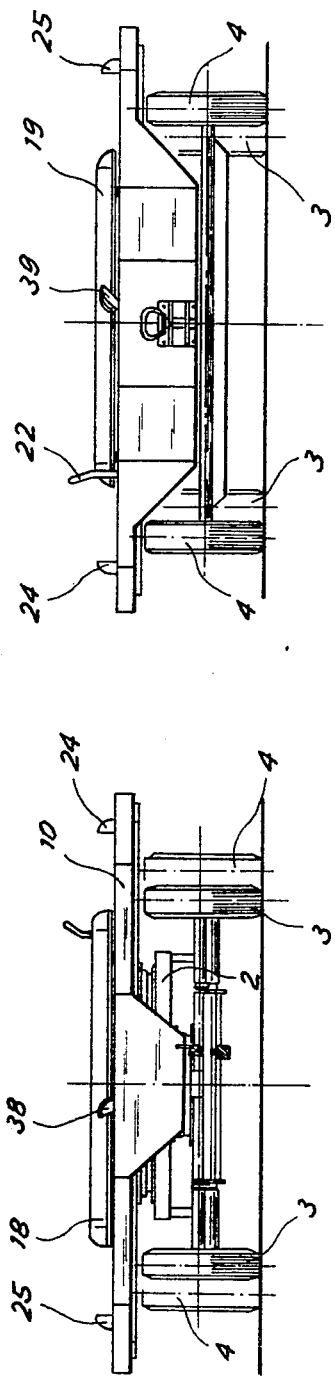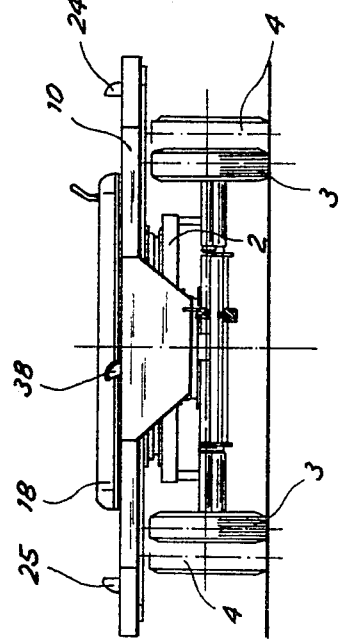

4,756,660

TRUCK WITH ROTATABLE PLATFORM SUITABLY DESIGNED FOR APPROACH AND COPENETRATION BY INTERMEDIATE TRANSPORTATION MEANS, FOR AUTOMATICALLY TRANSFERRING AIRCRAFT CARGO UNITS

This application is a continuation of application Ser. No. 748,461, filed June 25, 1985, now abandoned.

BACKGROUND OF THE INVENTION

The present invention relates to a towable truck provided with a rotatable platform, suitably designed for approach and copenetration by intermediate transportation means for automatically transferring aircraft cargo units, such as containers, pallets, igloos or the like, for their transportation from the aircraft to the stores or warehouses and vice versa.

Aircraft are currently loaded and unloaded with the aid of three types of freight handling units:
aircraft loading and unloading elevators;
intermediate transportation means;
trucks with a fixed or rotatable platform.

Taking for example the operations involved in unloading an aircraft (the procedure is obviously the reverse for loading), these take place in the following manner. The unloading elevator is positioned to correspond with the aircraft hatch, and the cargo units are transferred thereby on to the intermediate means. The intermediate means shuttle to and from a row of trucks to transfer the cargo units to them, which then transport them to the warehouses or stores. In special cases, the intermediate means can be dispensed with, and the cargo units be transferred directly on to the trucks by the elevator.

The known intermediate transportation means and trucks are designed such that their respective floors are usually brought alongside each other for transferring the cargo units from the intermediate means to the trucks or vice versa. This arrangement therefore means that the responsible personnel have to effect these transfer operations manually, with a consequent considerable employment of labour.

SUMMARY OF THE INVENTION

The present invention obviates this and further drawbacks of known trucks by providing a towable truck comprising a rotatable platform which can be approached and copenetrated by intermediate transportation means or other freight handling means provided with a floor having at least one complementary terminal part provided with motorized rollers, thus allowing automatic transfer of the cargo units on to or from the trucks, and consequently improved economy and speed of the loading and unloading operations.

The truck according to the invention comprises:
a rigid frame supported by pairs of wheels, at least one pair of which steers and is connected to a drawbar of known type;
one or two end platforms fixed to the frame to project transversely therefrom, above the front pair of wheels or/and the rear pair of wheels, and designed to form a service footboard for the operators controlling the loading and unloading of the truck;
a central loading platform, rotatable about a vertical axis and formed from two trapezoidal elements having their major bases in an opposing, parallel and suitably spaced-apart relationship and, when the truck is in its loading or unloading position, disposed transversely to the longitudinal axis of said truck and projecting beyond the frame, said two trapezoidal elements being inscribed within an ideal circumference substantially tangential to the inner side of the fixed end platforms of diameter substantially equal to the major dimension of said end platforms, and are connected to a rectangular element intermediate between said trapezoidal elements and to two rectangular lateral end elements in order to form an ideal continuous support floor along the longitudinal axis of the truck. The trapezoidal elements and the rectangular intermediate and lateral end elements carry balls, rollers or other similar slide and support means for the cargo units.

The alternating arrangement of projecting and re-entering parts of the central rotatable platform of the truck according to the invention is such as to enable a terminal part of intermediate transportation means or the like provided with projections and re-entering portions which are complementary to those of the central rotatable platform, to come alongside the truck and to copenetrate it in order to form a substantially continuous floor without level differences or empty spaces, and provided with slide rollers and/or balls to facilitate transfer of the cargo units. By suitably motorising part of the slide rollers and rubber-covered friction wheels disposed on the terminal part of the intermediate transportation means or the like, the cargo units can be automatically transferred on to the truck according to the invention or vice versa.

The truck according to the invention also comprises cargo guide shoulders transverse to the longitudinal axis of the truck, lowerable stop blocks to secure the cargo during its transportation and disposed at the ends of the trapezoidal parts, manual and/or automatic controls for lowering said stop blocks during the loading or unloading stages, and means for locking the rotation of the rotatable platform an angles of 90°.

DESCRIPTION OF THE DRAWINGS

These and further characteristics will be apparent from the detailed description of one embodiment of the truck according to the invention, given hereinafter by way of example with reference to the accompanying drawings in which:

FIG. 1 is a plan view of the truck according to the invention, with the rotatable platform in its loading or unloading position, FIG. 2 is a plan view of the truck of FIG. 1, with the rotatable platform rotated through 90°, FIG. 3 is a partial view from above of the truck of FIG. 1 with the terminal part of intermediate transportation means brough alongside, and FIGS. 4, 5 and 6 are a side, front and rear view respectively of the truck of FIG. 1.

DETAILED DESCRIPTION

With reference to the accompanying figures, the truck 1 comprises a substantially triangular rigid frame 2 supported by pairs of wheels 3 and 4, the pair of wheels 3 being steering wheels and connected to a drawbar 5 of known type.

Two fixed end platforms are fixed on to the rigid frame 2 above the front pair of wheels 3 and rear pair of wheels 4 respectively, and project transversely beyond said rigid frame 2.

In the central part of the truck 1, between the front end platform 6 and rear end platform 7, there is provided a rotatable central platform 8 which can rotate through 360° in either direction about a vertical axis X in a known manner, for example by means of a ball thrust bearing 9 or like rolling means, supported by the rigid frame 2, or by racks or toothed wheels or similar means suitable for rotating the rotatable platform 8 relative to the rigid frame 2.

The rotatable platform 8 comprises two trapezoidal elements 10, 11 disposed with their major bases in an opposing, parallel, spaced-apart relationship and positioned, when the truck 1 is in the loading or unloading position shown in FIGS. 1, 3, 4, 5 and 6, transversely to the longitudinal axis of the truck 1 and projecting beyond the frame in such a manner that said two trapezoidal elements are inscribed within an ideal circumference which is substantially tangential to the inner sides of the fixed end platforms 6 and 7 and has a diameter substantially equal to the major dimension of said fixed end platforms 6 and 7.

The trapezoidal elements 10 and 11 are connected to an intermediate rectangular element 12 and to two lateral rectangular elements 13 and 14, in such a manner as to form an ideal support floor disposed along the longitudinal axis of the truck 1 and transverse to the trapezoidal elements 10 and 11, its width being less than the bases of said trapezoidal elements so as to define, on the sides of the truck 1, alternate projecting and re-entering portions designed to copenetrate complementary terminal parts present in the intermediate transportation means or the like.

The trapezoidal elements 10 and 11 are constituted by a perimetral section 15 shaped substantially as an isosceles trapezium and arranged to support and retain parallel slide rollers 16 perpendicular to the bases of the two trapezoidal elements 10 and 11, the intermediate rectangular elements 12 and lateral end rectangular elements 13 and 14 comprising ball rollers 17 for supporting the cargo units and sliding them along the truck 1. The rectangular lateral end elements 13 and 14 are also provided respectively with vertical shoulders 18 and 19 having end portions flared outwards to form a lead-in and designed to form guides for the cargo units and to facilitate their transfer on to or from the truck. A further purpose of the vertical shoulders 18 and 19 is to prevent any lateral sliding of the cargo units during transportation.

According to the present invention, stop pins and relative co-operating elements are provided in order to lock the rotatable platform 8 in rotated positions 90° apart, two of these positions corresponding to loading and unloading positions, and two to transportation positions, at 180° apart respectively. More particularly, on the inside edge of one of the two fixed end platforms 6 and 7, for example on the platform 7 as shown in FIG. 1, there is provided a locking pin 20 of horizontal axis, which is slidable in a sleeve 21 in such a manner as to be able to project from or be retracted into said sleeve 21 by means of a manual lever control 22 or the like, said pin 20 being designed to engage in diametrically opposing co-operating slot elements 23 provided on the shoulders 18 and 19 and on the peripheral sections 15 of the trapezoidal elements 10, 11 so as to correspond diagonally with said pin 20 when the rotatable platform 8 is in its loading or unloading positions and in its transportation positions. Suitable reinforcements which also constitute a lead-in for the pin 20 are provided in proximity to the co-operating slot elements 23.

The two trapezoidal elements 10 and 11 also comprise, at the ends over which sliding takes place, pairs of lowerable blocks 24 and 25 for locking any movement of the cargo units in a direction parallel to the longitudinal axis of the two trapezoidal elements 10, 11. Said pairs of blocks 24 and 25 normally project from the support surface, and can be each lowered independently below said surface both automatically and manually. Said blocks have that surface facing outwards from the truck configured as a lead-in and are connected to return springs so that, even if the manual or automatic control is absent, lowering takes place by utilising the kinetic energy of the cargo unit as it passes from the intermediate transportation means to the truck.

Automatic lowering of the pairs of blocks 24 and 25 is done by lever transmission mechanisms suitably arranged below the support surface of the rotatable platform 8. In particular, two pairs of tie rods 26, 27, parallel to the longitudinal axis of the trapezoidal elements 10, 11, are connected respectively at one end to each block of the pairs of blocks 24 and 25 and at the other end to transverse rods 28, 29 respectively. The transverse rods 28, 29 are rigid at their centre with couplings 30 and 31 respectively, in which further rods 32, 33 parallel to the pairs of tie rods 26, 27 can be housed and made rigid in a known manner, for example by pins. The ends of each of the further rods 32, 33 which project outwards from the intermediate rectangular element 12 terminate in striking elements 34, 35 respectively, which are designed to be operated by being thrust by the central projection of the terminal part of the intermediate transportation means, or the like, in order to automatically lower the pairs of blocks 24, 25.

The opposite end of the further rods 32, 33 is connected, for example by a connecting rod and crank, to the ends of transverse rods 36, 37 respectively, which terminate in pedals 38, 39 respectively, striking elements, handles or the like, disposed at the other end of said transverse rods 38 and 39 respectively, between the shoulders 18, 19 and the corresponding fixed end platforms 6, 7, or in another suitable position of easy and comfortable accessibility, for manually controlling the pairs of blocks 24, 25. Return springs 40, 41 mounted on the further rods 32, 33 between the couplings 30, 31 and the transverse stiffening sections 42, 43 disposed between the two trapezoidal elements 10, 11, maintain and/or return the transverse rods 28, 29 to their rest position, so as to cause the pairs of blocks 24, 25 to project from the support surface.

The operation is as follows. The terminal part of the intermediate transportaion means 44 carrying the cargo unit to be transferred on to the truck 1 is brought alongside said truck 1 so that they copenetrate, and the central projection 45 of said terminal part presses its support structure 46 against the striking element, for example 35, for automatically causing lowering of the pair of blocks 25, which become lowered below the support surface to thus allow the cargo unit to be easily transferred automatically on to the truck 1 by operating intermediate slide rollers, not shown, and suitably motorised friction wheels 47.

The cargo unit then slides along the projections of the terminal part of the intermediate transportation means 44 and between the shoulders 18, 19 of the trapezoidal elements 10, 11 until it stops against the pair of blocks 24 which project at the opposite end by the action of the return spring 40 which presses against the respective coupling 30 which is rigid with the rod 28 and thus with the tie rods 26. When the cargo unit has been positioned on the truck 1, the intermediate transportation means or the like 44 is withdrawn, and the striking element 35, under the action of the return spring 41, returns to its rest position, to operate the tie rods 27 and thus return the blocks 25 to their erect position. The cargo unit therefore remains locked in all directions by the vertical shoulders 18, 19 and the pairs of blocks 24, 25.

In order to orientate the rotatable platform 8 in the position for transportation by the truck 1, said platform is released by the manual control lever 22, which disengages the pin 20 from the corresponding co-operating slot element 23, and the platform is rotated through 90°, after which the pin 20 is engaged in a further slot element 23 by again operating the lever 22 in the reverse direction.

Numerous modifications can be made with regard to the type and constitution of the controls for the locking means and to the locking means themselves, with regard to the means provided for rotating the rotatable platform, and with regard to the form of the truck and of its parts, without departing from the scope of the present invention.

What is claimed is:

1. A towable truck comprising:
   a rigid frame supported by wheels, at least one pair of which steers the truck and is connected to a drawbar;
   at least one end platform fixed to the frame to project transversely therefrom above a pair of wheels to form a service footboard;
   a central platform rotatable on thrust bearing means carried in said frame and about a vertical axis, said platform including two trapezoidal elements which have their major bases in an opposing, parallel and spaced-apart relationship and disposed, when the truck is in its loading and unloading position, transversely to the longitudinal axis of said frame and projecting beyond it, said trapezoidal elements being joined to an intermediate rectangular element and to two lateral rectangular end elements which do not project transversely beyond the frame, said central platform being inscribed in a circle substantially tangential to an inner side of said at least one end platform and having a diameter substantially equal to the major dimension of said at least one end platform, and forming a support floor disposed along the longitudinal axis of the truck, to define transverse projecting and re-entering parts alternating along the longitudinal sides of the truck for approach and copenetration by complementary terminal parts of an intermediate transportation means;
   a vertical shoulder disposed on each of said lateral rectangular end elements parallel to the longitudinal axis of said trapezoidal elements to form guides and offer protection against lateral movements of cargo units carried on said central platform, said shoulders having their ends flared to form a lead-in;
   load blocks which can be lowered below an upper surface of said central platform and disposed at ends of the trapezoidal elements over which sliding takes place to block cargo units carried on said central platform from movement in a direction parallel to the longitudinal axis of said trapezoidal elements;
   control means for lowering said load blocks;
   locking means for locking the rotation of the rotatable platform in positions 90° apart;
   said trapezoidal elements including a perimetral section to support and retain load slide means having axes parallel to each other and perpendicular to the bases of the two trapezoidal elements;
   said intermediate rectangular and lateral rectangular end elements carrying ball rollers to form a resting and slide surface for cargo units;
   said load blocks being movable from a first position in which they project upwardly from the support floor to a second position in which they are recessed below the support floor;
   retaining means for retaining said blocks in said first position; and
   release means for releasing said retaining means, said blocks having lead-in means formed in the surfaces of the blocks which face outwards from the truck, and said lead-in means being cooperable with actuating surfaces on a cargo unit for releasing said retaining means by utilizing kinetic energy of the cargo unit.

2. A truck as claimed in claim 1, including operating means for lowering the load blocks, said operating means including a pair of tie rods parallel to the longitudinal axis of said trapezoidal elements and connected at one end to the load blocks and at the other end to a transverse rod rigid with a central coupling, in which there is disposed and fixed a central longitudinal rod having one end projecting outwards from the intermediate rectangular element and terminating in a striking element to be struck by a central projection of the terminal part of an intermediate transportation means in order to automatically control the load blocks, said longitudinal rod having its other end connected by a connecting rod and crank having its other end connected by a connecting rod and crank to a further transversely-disposed rod projecting laterally outwards from the lateral rectangular end elements and terminating in manual operating means for the manual control of the blocks, said central longitudinal rod having a return spring disposed between said central coupling and a fixed stiffening transverse bar connecting together the major bases of the trapezoidal elements, for the normal positioning of the load blocks in an upwardly projecting position.

* * * * *